United States Patent
Myrah et al.

(10) Patent No.: US 9,037,925 B2
(45) Date of Patent: May 19, 2015

(54) CHANGE MESSAGE BROADCAST ERROR DETECTION

(75) Inventors: Michael G. Myrah, Tomball, TX (US); Balaji Natrajan, Houston, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 188 days.

(21) Appl. No.: 13/885,687

(22) PCT Filed: Nov. 30, 2010

(86) PCT No.: PCT/US2010/058416
§ 371 (c)(1),
(2), (4) Date: May 16, 2013

(87) PCT Pub. No.: WO2012/074515
PCT Pub. Date: Jun. 7, 2012

(65) Prior Publication Data
US 2013/0246863 A1    Sep. 19, 2013

(51) Int. Cl.
*G06F 11/30*    (2006.01)
*G06F 11/07*    (2006.01)

(52) U.S. Cl.
CPC ........ *G06F 11/0709* (2013.01); *G06F 11/0727* (2013.01); *G06F 11/0745* (2013.01); *G06F 11/0751* (2013.01)

(58) Field of Classification Search
CPC .................................................. G06F 11/0751
USPC ................................................... 714/47.2, 48
See application file for complete search history.

(56) References Cited

U.S. PATENT DOCUMENTS

| | | | |
|---|---|---|---|
| 6,700,970 B1* | 3/2004 | Aronson et al. | 379/225 |
| 7,536,508 B2 | 5/2009 | Davies | |
| 7,536,584 B2 | 5/2009 | Davies et al. | |
| 2007/0070885 A1 | 3/2007 | Uddenberg et al. | |
| 2008/0005620 A1 | 1/2008 | Walker | |
| 2008/0010530 A1 | 1/2008 | Davies et al. | |
| 2009/0003197 A1 | 1/2009 | Jones | |
| 2009/0077413 A1 | 3/2009 | Dake et al. | |
| 2009/0094620 A1 | 4/2009 | Kalwitz et al. | |
| 2012/0147733 A1* | 6/2012 | Wang | 370/216 |

OTHER PUBLICATIONS

ISR/WO PCT/US2010/058416, Aug. 2, 2011, 10 pps.
Managing Access Control through SAS Zoning; http://techon.nikkeibp.co.jp/article/HONSHI/20061120/124030/ > Publication Date: Nov. 20, 2006.

* cited by examiner

*Primary Examiner* — Chae Ko
(74) *Attorney, Agent, or Firm* — Michael A. Dryja

(57) ABSTRACT

A hardware device detects change messages broadcast within a system. The system includes the hardware device, one or more controller devices, one or more expander devices, and one or more target devices interconnected among one another. The hardware device determines whether the change messages were broadcast within the system every first period of time or less for at least a second period of time, the first period of time less than the second period of time. In response to determining that the change messages were broadcast within the system every first period of time or less for at least the second period of time, the hardware devices signals that an error has been detected.

15 Claims, 3 Drawing Sheets

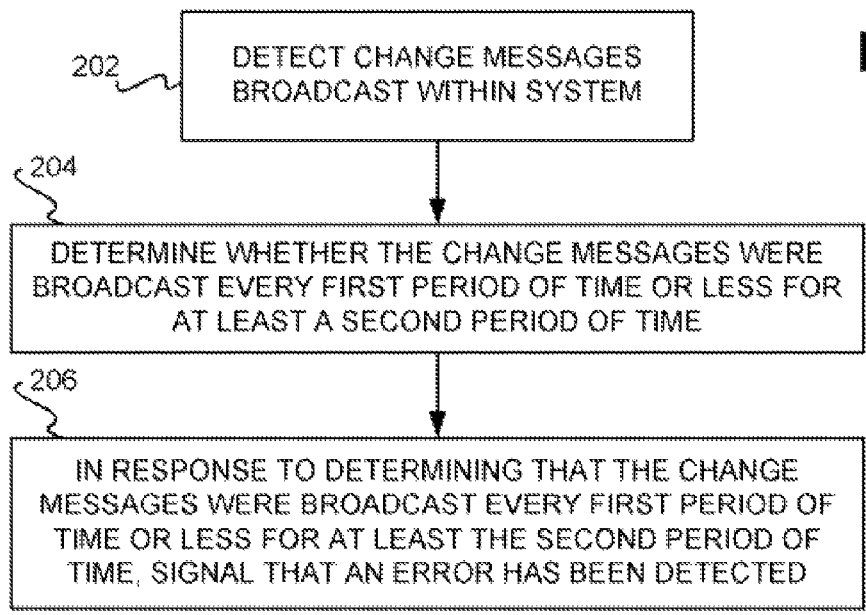
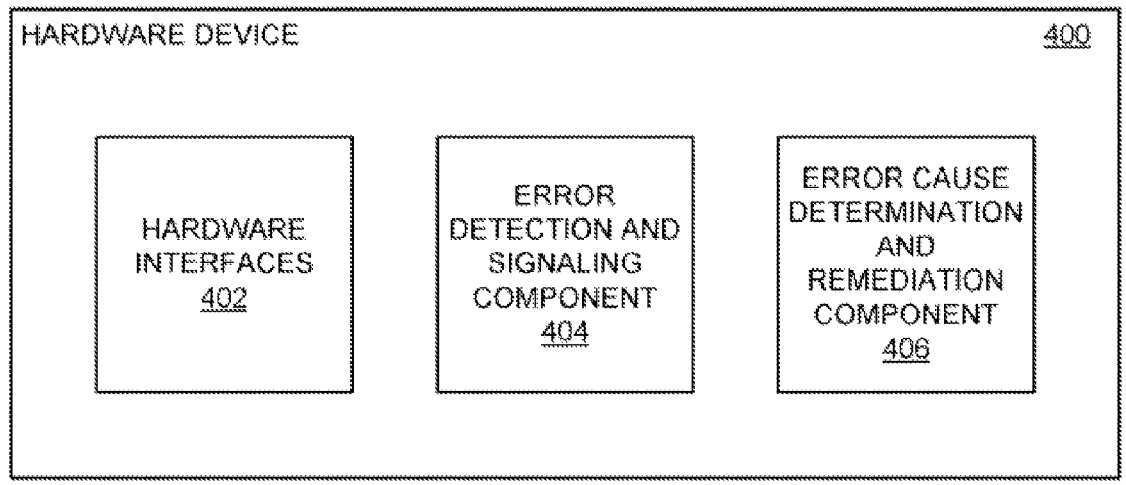

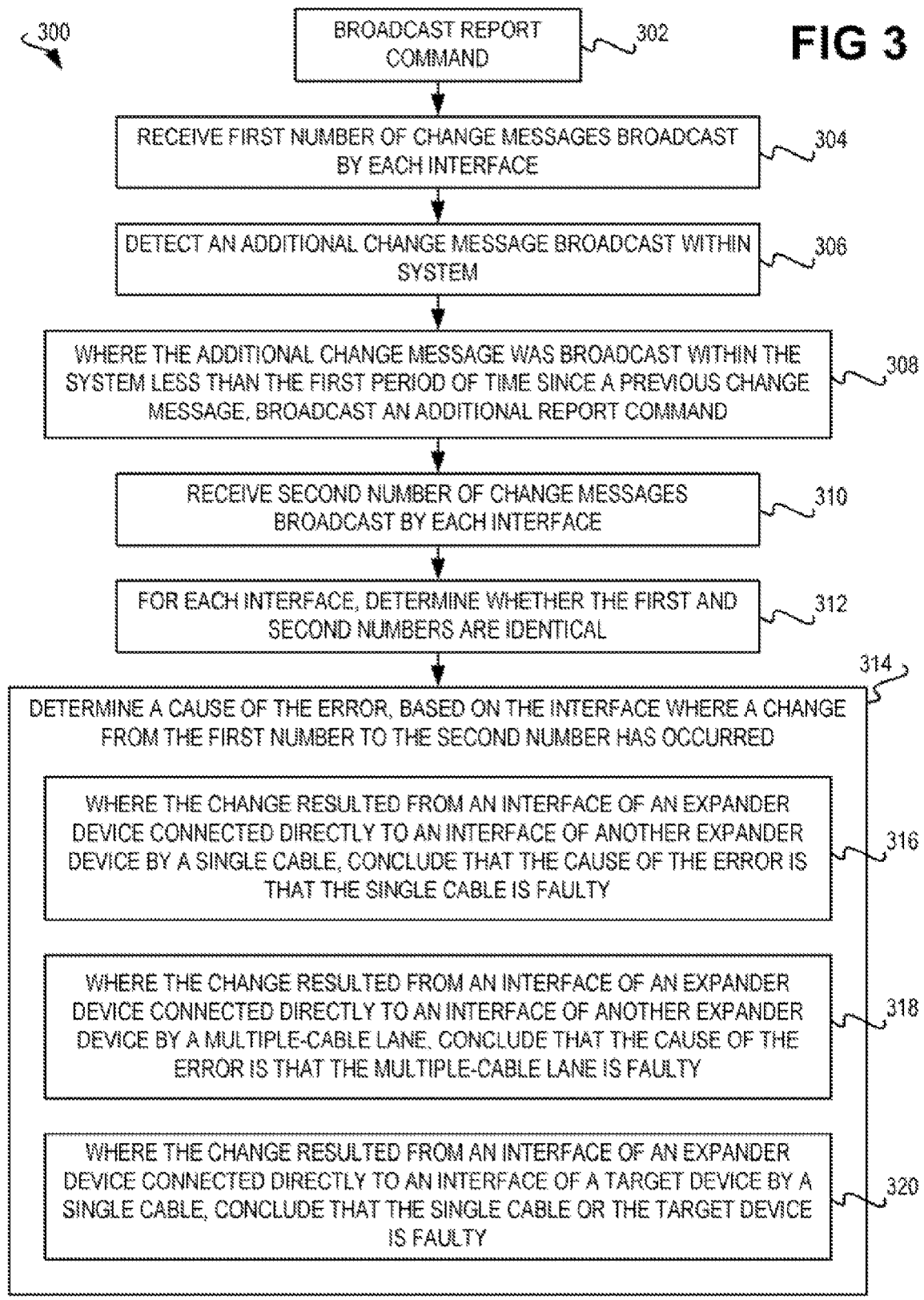

CHANGE MESSAGE BROADCAST ERROR DETECTION

BACKGROUND

Small computer system interface (SCSI)-attached storage (SAS) systems have become increasingly popular, especially for enterprise environments and other large environments in which large amounts of data storage space is desirable. A SAS system can include initiator devices, expander devices, switches, and target devices. An initiator device is a controller that may be part of a host computing device to which data storage space is to be made available. A target device is a storage device, such as a hard disk drive, or an array of storage devices. An expander device permits multiple target devices to be connected to initiator devices. Similarly, a switch permits multiple target devices to be connected to initiator devices, but may further able to segment. The target devices and the initiator devices among different zone groups.

BRIEF DESCRIPTION OF THE DRAWINGS

FIG. 2 is a flowchart of an example method to detect an error within a system.
FIG. 3 is a flowchart of an example method to determine a cause of an error that has been detected within a system.
FIG. 4 is a diagram of an example hardware device.

DETAILED DESCRIPTION

Figure 1:
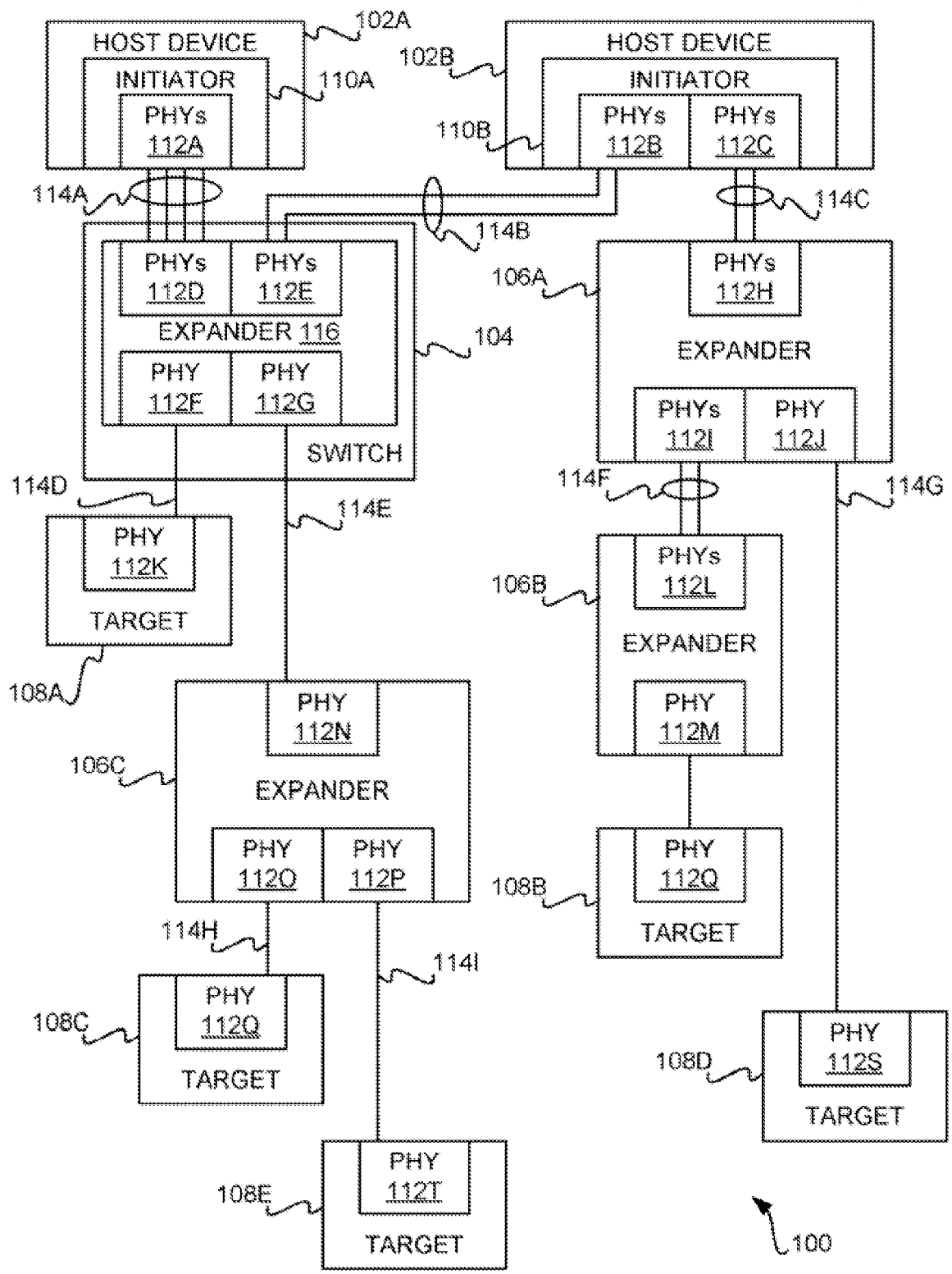
FIG. 1 is a diagram of an example system.

As noted in the background section, small computer system interface (SCSI)-attached storage (SAS) systems have become increasingly popular. A SAS system can be a hot-pluggable system, which means that devices can be connected or disconnected within the system without having to power down the system. Each time a device is electrically connected or disconnected within a SAS system, a change message is broadcast within the system.

Specifically, a SAS broadcast change message is broadcast within a SAS system each time a device is electrically connected or disconnected within the system. A SAS broadcast change message is more particularly referred to as a BROADCAST (CHANGE) message. A SAS broadcast change message is specifically broadcast by a physical interface of a device within a SAS system to which a physical interface of another device that is being electrically connected or disconnected within the system. The physical interface of a device within a SAS system is referred to as a PHY interface, or simply as a PHY.

For example, a SAS system may already include an expander device. If a PHY of a target device is electrically connected to a PHY of this expander device, such as via a SAS cable, the PHY of the expander device issues a SAS broadcast change message within the SAS system. Similarly, if the PHY of the target device is subsequently electrically disconnected from the PHY of the expander device, the PHY of the expander device also issues a SAS broadcast change message within the SAS system.

What is referred to as a broadcast change message storm can occur within a SAS system, however, due to an error occurring within the system. For example, the SAS cable electrically connecting the PHY of an expander device to the PHY of a target device may become faulty, such that electrical connection between the PHYs may become intermittent. As such, the PHY of the expander device may issue a large number of SAS broadcast change messages over a short period of time, each time the electrical connection in question is disrupted, and again each time the electrical connection is temporarily resumed.

A SAS broadcast change message generally indicates just that a change has occurred within a SAS system, and does not otherwise provide much, if any, information regarding the change. Therefore, each time a SAS broadcast change message is broadcast within a SAS system, one or more devices within the SAS system may initiate discovery of the devices that are now connected within the SAS system. This discovery process can entail significant overhead both in terms of processing bandwidth in each such device, and in terms of communication bandwidth within the SAS system as a whole.

As such, when a broadcast change message storm occurs within a SAS system, the system may undesirably slow down, and even become effectively nonfunctional. Each device that initiates discovery of the devices that are connected within the SAS system may not be able to perform other types of processing. The communication bandwidth within the SAS system may become overwhelmed by the various messages sent within the system for achieving such discovery.

Disclosed herein are example techniques for detecting an error within a system like a SAS system, such as that which results in a broadcast change message storm. Specifically, a hardware device within the system, like a switch or other hardware device, detects the change messages broadcast within the system. The hardware device determines whether the change messages were broadcast every first period of time or less for at least a second period of time. For instance, the hardware device may determine whether the change messages were broadcast every eight seconds or less for at least sixty seconds. If this is the case, then the hardware device signals that an error has been detected.

Also disclosed herein are example techniques for detecting where such an error that has been detected occurs within a system like a SAS system. The error may therefore be able to be resolved. Once an error has been detected by a hardware device within the system, the hardware device broadcasts a report command within the system, such as a SAS broadcast report command that is also referred to as a SAS REPORT BROADCAST command. In response, the hardware device receives a first number of change messages broadcast iby each interface of each other device within the system.

When the next change message broadcast within the system occurs less than the first period of time since the previous change message was broadcast, the hardware device broadcasts another report command within the system. In response, the hardware device receives a second number of change messages broadcast by each interface of each other device within the system. For each such interface, the hardware device determines whether the first and second numbers are identical. The hardware device thus determines the location of the error based on the interface where a change from the first number to the second number has occurred.

FIG. 1 shows an example SAS system 100. The SAS system 100 includes host de vices 102A and 102B, collectively referred as to the host devices 102; a switch 104 having an expander device 116; other expander devices 106A, 106B, and 106C, collectively referred to as the expander devices 106; and, target devices 108A, 108B, 108C, 108D, and 108E, collectively referred to as the target devices 108. The number of each type of device within the SAS system 100, and how the devices are interconnected with one another, can vary; the number of and interconnection among the devices as in FIG. 1 is just an example.

The host devices 102 can each be a computing device, such as a desktop computer. The host devices 102 include initiator devices 110A and 110B, which are collectively referred to as the initiator devices 110. The initiator devices 110 are more generally referred to as controller devices. The initiator device 110A includes four PHYs 112A, whereas the initiator device 110B includes two PHYs 112B and two PHYs 112C.

As noted above, each PHY 112 is a physical interface, which may also be referred to as a hardware interface. A PHY 112 is a smart interface, in that it is able to perform processing, such as sending and receiving messages, as well as storing values. In this respect, the terminology interface as used herein is not just a number of electrical connectors that permit a device to be connected to corresponding connectors of a cable or another device. Rather, an interface is itself able to perform processing, apart from its constituent device, as is described in more detail below.

The switch 104 includes the expander device 116 that includes four PHYs 112D, two PHYs 112E, PHY 112F, and PHY 112G. The PHYs 112D, 112E, 112F, and 112G of the expander device 116 are also referred to herein as the PHYs 112D, 112E, 112F, and 112G of the switch 104 itself. Via a multiple-SAS cable lane 114A, the PHYs 112D of the switch 104 are directly physically and electrically connected to the PHYs 112A of the initiator device 110A. Via a narrower multiple-SAS cable lane 114B, the PHYs 112E of the switch 104 are directly physically and electrically connected to the PHYs 112E of the initiator device 110A.

The expander device 106A includes two PHYs 112H, PHY 112I, and PHY 112J. Via a multiple-SAS cable lane 114C, the PHYs 112H of the expander device 106A are directly physically and electrically connected to the PHYs 112C of the initiator device 110B. The expander device 106 includes two PHYs 112L and PHY 112M. Via a multiple-SAS cable lane 114F, the PHYs 112L of the expander device 106B are directly physically and electrically connected to the PHYs 112I of the expander device 106A. The expander device 106C includes PHYs 112N, 112O, and 112P. Via a single SAS cable 114E, the PHY 112N of the expander device 106C is directly physically and electrically connected to the PHY 112G of the switch 104.

The target devices 108 can each be a storage device, or an array of storage devices. An example of such a storage device includes a hard disk drive. The target device 108A includes a PHY 112K that is directly physically and electrically connected to the PHY 112F of the switch 104 via a single SAS cable 114D. The target device 108B includes a PHY 112Q that is directly physically and electrically connected to the PHY 112M of the expander device 106B via a single SAS cable 114H.

The target device 108C includes a PHY 112R that is directly physically and electrically connected to the PHY 112O of the expander device 106C via a single SAS cable 114I. The target device 108D includes a PHY 112S that is directly physically and electrically connected to the PHY 112J of the expander device 106A via a single SAS cable 114G. The target device 108E includes a PHY 112T that is directly physically and electrically connected to the PHY 112P of the expander device 106C via a single SAS cable 114J.

The initiator devices 110 permit their host devices 102 to access the target devices 108 within the SAS system 100. Specifically, the host device 102A may be able to access the target devices 108A, 108C, and 108E, but is unable to access the target devices 108B and 108D. By comparison, the host device 102B may be able to access all the target devices 108.

The switch 104 is able to divide the initiator devices 110 and the target devices 108A, 108C, and 108E to which it is connected into different zone groups. For example, the switch 104 may permit the initiator device 110A to access the target device 108A but not the target devices 108C and 108D. The switch 104 may also permit the initiator device 110B to access all three target devices 108A, 108C, and 108E.

In this example, the switch 104 defines the target devices 108A, 108C, and 108E into two zone groups: a first zone group including the target device 108A, and a second zone group including the target devices 108C and 108E. The initiator device 110A is a member of just the first zone group. By comparison, the initiator device 110B is a member of both zone groups.

Both the switch 104 and the expander devices 106 are each able to permit more than one target device 108 downstream to be connected to the same upstream PHY 112. For example, the expander device 106C permits two downstream target devices 108C and 108E to be connected to the same upstream PHY 112G. In FIG. 1, downstream communication is from the top of the figure to the bottom of the figure, and upstream communication is from the bottom of the figure to the tip of the figure. Unlike the switch 104, the expander devices 106 are unable to divide their connected devices into different zone groups.

The PHYs 112 of the target devices 108 are typically receptive to connection of a single SAS cable 114. For instance, the PHY 112K of the target device 108 is connected to the PHY 112 of the switch 104 via the single SAS cable 140. By comparison, the PHYs 112 of the initiator devices 110, the switch 104, and the expander devices 106 can be interconnected via multiple-SAS cable lanes 114 or by single SAS cables 114. For instance, the PHYs 112A of the initiator device 110A are connected to the PHYs 112D of the switch 104 via a fours-SAS cable lane 114A, whereas the PHYs 112I of the expander device 106A are connected to the PHYs 112L of the expander device 106B via a two-SAS cable lane 114F. Furthermore, the PHY 112G of the switch 104 is connected to the PHY 112N of the expander device 106C via a single SAS cable 114E.

In general, the more SAS cables that interconnect two PHYs 112, the greater the communication bandwidth between the two PHYs 112. For instance, the communication bandwidth between the PHYs 112I and 112L of the expander devices 106A and 106B can be up to twice the communication bandwidth between the PHY 112J of the expander device 106A and the PHY 112S of the target device 108D. Similarly, the communication bandwidth between the PHYs 112A of the initiator device 110A and the PHYs 112D of the switch 104 can be up to twice the communication bandwidth between the PHYs 112B of the initiator device 110B and the PHYs 112E of the switch 104, and up to four times the communication bandwidth between the PHY 112G of the switch 104 and the PHY 112N of the expander device 106C.

It is noted that FIG. 1 shows to at least some extent more of a theoretical or architectural depiction of the representative SAS system 100 than how such a SAS system 100 is implemented in actuality. In actuality, each expander device 106 is typically part of another physical device, and is not a separate physical device in and of itself. For instance, the expander device 106C may be part of a target device enclosure, such as a storage device enclosure, which also includes the target devices 108C and 108E. The expander device 106A may be part of another switch, and the expander device 106B may be part of a target device enclosure that also includes the target device 108B. In this example, the target device 108D may be a stand-alone target device. Furthermore, each PHY 112 is typically part of a physical port, where there may be one PHY 112, or more than one PHY 112, for each physical port.

The SAS system 100 is a hot-pluggable system. As noted above, this means that devices within the SAS system 100 can be electrically connected and disconnected without first powering down the SAS system 100. Each time a device is electrically connected or disconnected within the SAS system 100, a SAS broadcast change message is broadcast within the system 100. For example, if the SAS cable 114I interconnecting the PHY 112O of the expander device 106C and the PHY 112R of the target device 108C is removed from either or both the PHY 112O and the PHY 112R, the PHY 112O broadcasts a SAS broadcast change message within the SAS system 100. As another example, if the PHY 112S of the target device 108D is newly connected to the SAS cable 114F already connected to the PHY 112J of the expander device 106A, the expander device 106A (such as a PHY thereof) broadcasts a SAS broadcast change message within the SAS system 100.

If a PHY 112 or a SAS cable 114 is faulty, the corresponding electrical connection can become intermittent. For example, if the PHY 112S of the target device 108D or the SAS cable 114G connecting this PHY 112 with the PHY 112J of the expander device 106A is faulty, each time the electrical connection is disrupted, the PHY 112J broadcasts a SAS broadcast change message. Similarly, each time the electrical connection is temporarily resumed, the expander device 106A (such as a PHY thereof) broadcasts a SAS broadcast change message. A broadcast change message storm can result, which can impede the proper functioning of the SAS system 100.

FIG. 2 shows an example method 200 for detecting such an error within a system like the SAS system 100 of FIG. 1. The method 200, like other example methods disclosed herein, can be performed by a hardware device within the system. For example, the method 200 may be performed by the switch 104 of FIG. 1.

Furthermore, the method 200, like other example methods disclosed herein, can be implemented as one or more computer programs stored on a non-transitory computer-readable data storage medium. Execution of the computer program by a processor of a hardware device, such by a processor of the switch 104 of FIG. 1, causes the method 200 to be performed. It is noted that such an implementation encompasses the computer program being implemented via an application-specific integrated circuit (ASIC) or a field-programmable gate array (FPGA) within the hardware device.

The change messages broadcast within the system are detected (202). It is determined whether the change messages were broadcast every first period of time, or less, for at least a second period of time (204). For instance, it may be determined whether the change messages were broadcast every eight seconds or less for at least sixty seconds. In general, it can be determined whether the change messages were broadcast every M seconds or less for at least N seconds, where M is less than N.

If the change messages were broadcast every first period of time, or less, for at least a second period of time, then it is concluded that an error has been detected, and this error is signaled (206). For instance, the hardware device performing the method 200 may send a message that a broadcast change message storm has been detected. The hardware device may signal the error in other ways as well, such as by sounding an audible alarm.

FIG. 3 shows an example method 300 for determining the cause of an error within a system, such as the SAS system 100 of FIG. 1, once the error has been detected. That a broadcast change message storm has been detected does not provide the cause of this error. This is because change messages that are broadcast within the system do not indicate the PHY that broadcast these messages. As such, the method 300 provides a technique for determining the cause of this error within the system.

Responsive to detecting that the error has occurred within the system, such as resulting from the method 200 of FIG. 2 being performed, a report command is broadcast (302). The report command may be a SAS REPORT BROADCAST command broadcast by the hardware device performing the method 300. In response, a (first) number of change messages broadcast by each interface within the system, such as each PHY 112 within the SAS system 100 of FIG. 1, is received (304). The number of change messages broadcast by an interface may be reported via a message including a BROADCAST COUNT value of the interface. For example, each PHY 112 may report that it has broadcast one change message within the SAS system 100, where this information is received by the switch 104 of the system 100.

In response to detecting an additional change message has been broadcast within the system (306), if the additional change message was broadcast less than the first period of time since a previous change message was broadcast within the system, then an additional report command is broadcast within the system (308). For example, if the next change message was broadcast less than eight seconds since the previous change message was broadcast then the hardware device performing the method 300 sends an additional report command. The additional report command may also be a SAS REPORT BROADCAST command broadcast by the hardware device performing the method 300, such as the switch 104 of the SAS system 100 of FIG. 1.

In response, a (second) number of change messages broadcast by each interface within the system, such as each PHY 112 within the SAS system 100 of FIG. 1, is received (310). As before, the number of change messages broadcast by an interface may be reported via a message including a BROADCAST COUNT value of the interface. In the prior example, each PHY 112 may have originally reported that it has broadcast one change message within the SAS system 100. An additional change message may have been broadcast by the PHY 112J of the expander device 106A, due to the PHY 112S of the target device 108D no longer being electrically connected to the PHY 112J. In response to the additional report command broadcast in part 308, the PHY 112J reports it has broadcast two change messages within the SAS system 100. By comparison, each other PHY 112 still reports that it has just broadcast one change message within the SAS system 100.

Therefore, for each interface, such as for each PHY 112. Within the SAS system 100 of FIG. 1, it is determined whether the first number received in part 304 is identical to the second number received in part 310 (312). In this way, the hardware device performing the method 300, such as the switch 104 of FIG. 1, is able to locate where the error occurred within the system. In the prior example, just the PHY 112J sent a second number received in part 310 that was different from the first number sent by this PHY in part 304. As such, the hardware device is able to determine the cause of the error, based on the interface where a change has occurred from the first number received in part 304 to the second number received in part 310 (314), in the prior example, the hardware device is able to determine the cause of the error based on the fact that the PHY 112J is the interface where such a change has occurred.

Three example techniques for determining the cause of the error in part 314 are disclosed herein. First, if the change resulted from an interface of an expander device connected directly to an interface of another expander device by a single cable, it may be concluded that the cause of the cause of the error is that this single cable is faulty (316). In this respect, it may be assumed that the likelihood that either interface is faulty is low, such that the cause of the error is more likely to be the cable connecting the two interfaces together. This information may be sent by the hardware device performing the method 300, so that a network administrator or other user can act upon it. The interface in question of the upstream expander device may be temporarily disabled, so that the error is temporarily suppressed.

Second, if the change resulted from an interface of an expander device connected directly to an interface of another expander device by a multiple-cable lane, it may be concluded that the cause of the error is that this multiple-cable lane is faulty (318), such that one or more cables of the lane are faulty. In this respect as well, it may be assumed that the likelihood that either interface is faulty is low, such that the cause of the error is more likely to be the multiple-cable lane connecting the two interfaces together. This information may likewise be sent by the hardware device performing the method 300, so that a network administrator or other user can act upon it. The interface in question of the upstream expander device may be temporarily disabled, so that the error is temporarily suppressed.

Third, if the change resulted from an interface of an expander device connected directly to an interface of a target device by a single cable, it may be concluded that the single cable or the target device itself, such as the interface of this target device, is faulty (320). In this respect it may be assumed that the likelihood that the interface of the expander device is faulty is low, such that the cause of the error is more likely to be the single cable or the target device. This information may also be sent by the hardware device performing the method 300, so that a network administrator or other user can act upon it. The interface of the expander device may be temporarily disabled, so that the error is temporarily suppressed.

The example methods 200 and 300 of FIGS. 2 and 3 thus work together to detect errors such as broadcast change message storms, and to determine the cause of and temporarily suppress these errors. The error detection of the method 200 does not provide the cause of an error, but the method 300 does. Once the cause of an error has been detected, the interface that is broadcasting enough change messages to cause a broadcast change message storm can be temporarily disabled, so that the remaining devices within the system can still function.

In conclusion FIG. 4 shows an example hardware device 400. The example hardware device 400 can perform the methods 200 and 300 of FIGS. 2 and 3. The switch 104 of FIG. 1 may be one such hardware device 400.

The hardware device 400 includes one or more hardware interfaces 402 and two components 404 and 406. Each hardware interface 402 communicatively connects the hardware device 400 within a system that includes the hardware device, one or more controller devices, one or more expander devices, and one or more target devices. For instance, the system may be the SAS system 100 of FIG. 1, which includes initiator devices 110, expander devices 106, and target devices 108. In this example, each hardware interface 402 is a PHY.

The components 404 and 406 are each implemented at least in hardware. For example, each component 404 and 406 may be a computer program that is stored on a non-transitory computer-readable data storage medium of the hardware device 400 and that is executed by a processor of the device 400. The component 404 is an error detection and signaling component, and thus performs the method 200 of FIG. 2 that has been described. The component 406 is an error cause determination and remediation component, and thus performs the method 300 of FIG. 3 that has been described.

We claim:

1. A method comprising:
   detecting, by a hardware device within a system, a plurality of change messages broadcast within the system, the system comprising the hardware device, one or more controller devices, one or more expander devices, and one or more target devices interconnected among one another;
   determining, by the hardware device, whether the change messages were broadcast within the system every first period of time or less for at least a second period of time, the first period of time less than the second period of time;
   in response to determining that the change messages were broadcast within the system every first period of time or less for at least the second period of time, signaling by the hardware device that an error has been detected.

2. The method of claim 1, wherein each change message indicates that a change in a membership of the system has occurred, such that one of the controller devices, the expander devices, and the target devices has been electrically connected or disconnected within the system.

3. The method of claim 1, wherein each target device includes one or more storage devices,
   wherein the hardware device is a switch device,
   wherein each target device is directly connected to one of the controller devices, to one of the expander devices, or to the hardware device by a single cable,
   wherein each expander device is connected to one of the controller devices, to a different one of the expander devices, or to the hardware device,
   wherein for each pair of a first expander device of the expander devices connected to a second expander device of the expander devices, the first expander device is connected to the second expander device by a single cable or by a multiple-cable lane.

4. The method of claim 1, wherein the system is a small computer system interface (SCSI)-attached storage (SAS) system, and each change message is a SAS broadcast change message.

5. The method of claim 1, further comprising:
   broadcasting, by the hardware device, a report command within the system;
   responsive to broadcasting the report command within the system, receiving by the hardware device a first number of change messages broadcast by each of one or more interfaces of each controller device, of each expander device, and of each target device;
   detecting, by the hardware device, an additional change message broadcast within the system;
   where the additional change message was broadcast within the system less than the first period of time since a previous change message was broadcast within the system,
      broadcasting, by the hardware device, an additional report command within the system;
      responsive to broadcasting the additional report command within the system, receiving by the hardware device a second number of change messages broadcast by each interface of each controller device, of each expander device, and of each target device;
      for each interface of each controller device, of each expander device, and of each target device, determining by the hardware device whether the first number and the second number are identical;

determining a cause of the error, by the hardware device, based on the interface where a change from the first number to the second number has occurred.

6. The method of claim 5, wherein determining the cause of the error comprises:
where the change resulted from an interface of a first expander device connected directly to an interface of a second expander device by a single cable, concluding by the hardware device that the cause of the error is that the single cable is faulty;
where the change resulted from an interface of a third expander device connected directly to an interface of a second expander device by a multiple-cable lane, concluding by the hardware device that the cause of the error is that the multiple-cable lane is faulty; and,
where the change resulted from an interface of a fourth expander device connected directly to an interface of a target device by a single cable, concluding by the hardware device that the cause of the error is that the interface of the target device is faulty, that the single cable is faulty, or that the target device is faulty.

7. A non-transitory computer-readable data storage medium having a computer program stored thereon for execution by a processor of a hardware device, execution of the computer program by the processor causing a method to be performed, the method comprising:
detecting a plurality of small computer system interface (SCSI)-attached storage (SAS) broadcast change messages broadcast within the SAS system, the SAS system comprising the hardware device, one or more SAS initiator devices, one or more SAS expander devices, and one or more SAS target devices interconnected among one another;
determining whether the SAS broadcast change messages were broadcast within the SAS system every first period of time or less for at least a second period of time, the first period of time less than the second period of time;
in response to determining that the SAS broadcast change messages were broadcast within the SAS system every first period of time or less for at least the second period of time, signaling an error has been detected.

8. The non-transitory computer-readable data storage medium of claim 7, wherein each SAS broadcast change message indicates that a change in a membership of the SAS system has occurred, such that one of the SAS initiator devices, the SAS expander devices, and the SAS target devices has been electrically connected or disconnected within the system.

9. The non-transitory computer-readable data storage medium of claim 7, wherein each SAS target device includes one or more storage devices,
wherein the hardware device is a SAS switch device,
wherein each SAS target device is directly connected to one of the SAS initiator devices, to one of the SAS expander devices, or to the SAS hardware device by a single SAS cable,
wherein each SAS expander device is connected to one of the SAS initiator devices, to a different one of the SAS expander devices, or to the SAS hardware device,
wherein for each pair of a first SAS expander device of the SAS expander devices connected to a second SAS expander device of the SAS expander devices, the first SAS expander device is connected to the second SAS expander device by a single SAS cable or by a multiple-SAS cable SAS lane.

10. The non-transitory computer-readable data storage medium of claim 7, wherein the method further comprises:

broadcasting SAS broadcast report command within the SAS system;
responsive to broadcasting the SAS broadcast report command within the SAS system, receiving a first number of SAS broadcast change messages broadcast by each of one or more SAS physical (PHY) interfaces of each SAS initiator device, of each SAS expander device, and of each SAS target device;
detecting an additional SAS broadcast change message broadcast within the SAS system;
where the additional SAS broadcast change message was broadcast within the SAS system less than the first period of time since a previous SAS broadcast change message was broadcast within the SAS system,
broadcasting an additional SAS broadcast repot command within the SAS system;
responsive to broadcasting the additional SAS broadcast report command within the SAS system, receiving a second number of SAS broadcast change messages broadcast by each SAS PHY interface of each SAS initiator device, of each SAS expander device, and of each SAS target device;
for each SAS PHY interface of each SAS initiator device, of each SAS expander device, and of each SAS target device, determining whether the first number and the second number are identical;
determining a cause of the error, based on the SAS PHY interface where a change from the first number to the second number has occurred.

11. The non-transitory computer-readable data storage medium of claim 10, wherein determining the cause of the error comprises:
where the change resulted from the SAS PHY interface of a first SAS expander device connected directly to the SAS PHY interface of a second SAS expander device by a single SAS cable, concluding that the cause of the error is that the SAS single cable is faulty;
where the change resulted from the SAS PHY interface of a third SAS expander device connected directly to the SAS PHY interface of a second SAS expander device by a multiple-SAS cable SAS lane, concluding that the cause of the error is that the multiple-SAS cable SAS lane is faulty; and,
where the change resulted from the SAS PRY interface of a fourth SAS expander device connected directly to a SAS PHY interface of a target device by a single SAS cable, concluding that the cause of the error is that the SAS PHY interface of the target device is faulty, that the SAS cable is faulty, or that the SAS target device is faulty.

12. A hardware device comprising:
a hardware interface to communicatively connect the hardware device within a system comprising the hardware device, one or more controller devices, one or more expander devices, and one or more target devices;
a hardware component to detect a plurality of change messages broadcast within the system, and to signal that an error has been detected where the change messages were broadcast within the system every first period of time or less for at least a second period, the first period of time less than the second period of time.

13. The hardware device of claim 12, wherein each change message indicates that a change in a membership of the system has occurred, such that one of the controller devices, the expander devices, and the target devices has been electrically connected or disconnected within the system, wherein each target device includes one or more storage devices, wherein the hardware device is a switch device, wherein each target device is directly connected to one of the controller devices, to one of the expander devices, or to the hardware device by a single cable, wherein each expander device is connected to one of the controller devices, to a different one of the expander devices, or to the hardware device, wherein for each pair of a first expander device of the expander devices connected to a second expander device of the expander devices, the first expander device is connected to the second expander device by a single cable or by a multiple-cable lane.

14. The hardware device of claim 12, wherein the system is a small computer system interface (SCSI)-attached storage (SAS) system, and each change message is a SAS broadcast change message.

15. The hardware device of claim 12, wherein the hardware component is a first hardware component, and the hardware device further comprises a second hardware component, wherein the second hardware component is to broadcast a report command within the system, and responsive to broadcasting the report command within the system, is to receive a first number of change messages broadcast by each of one or more interfaces of each controller device, of each expander device, and of each target device, wherein the second hardware component is to detect an additional change message broadcast within the system, and where the additional change message was broadcast within the system less than the first period of time since a previous change message was broadcast within the system, is to broadcasting an additional report command within the system, wherein the second hardware component, responsive to broadcasting the additional report command within the system, is to receive a second number of change messages broadcast by each interface of each controller device, of each expander device, and of each target device, wherein the second hardware component is to determine whether the first number and the second number are identical, for each interface of each controller device, of each expander device, and of each target device, and is to determine a cause of the error based on the interface where a change from the first number to the second number has occurred.

* * * * *